G. R. HOLLIGER.
VALVE FOR GAS ENGINE STARTERS.
APPLICATION FILED JUNE 15, 1912.
1,080,218.
Patented Dec. 2, 1913.
2 SHEETS—SHEET 1.
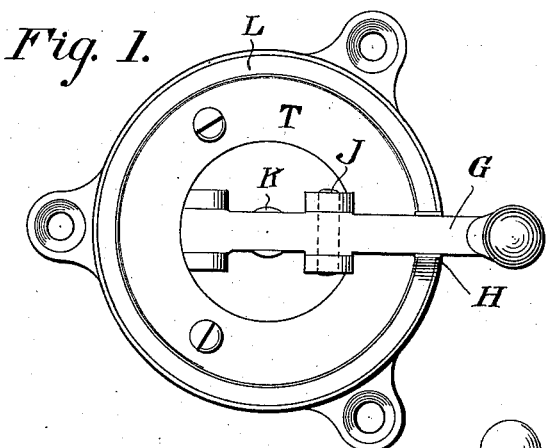
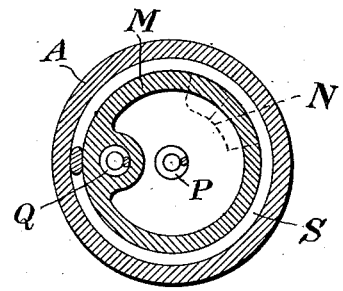
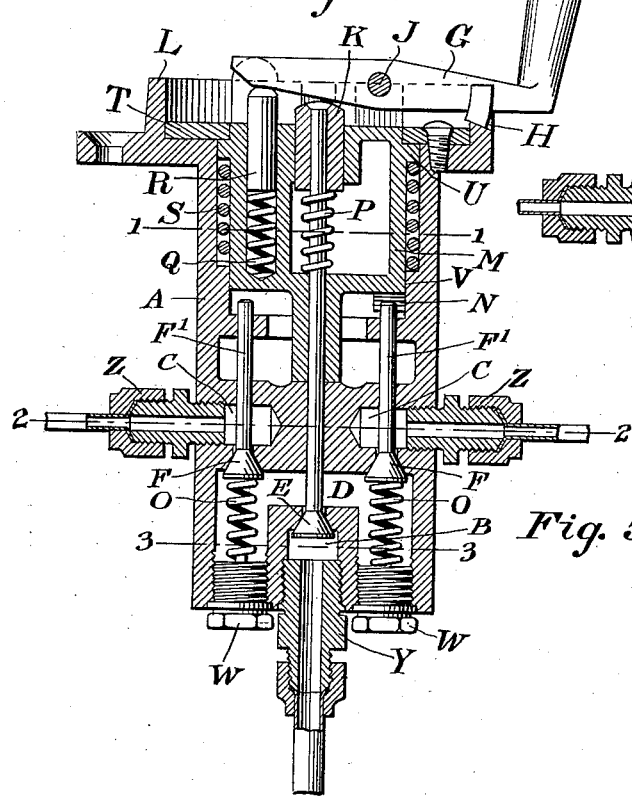
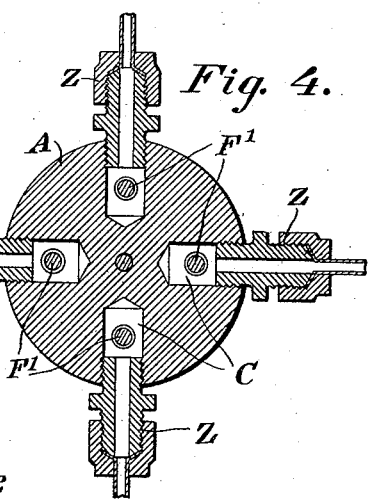
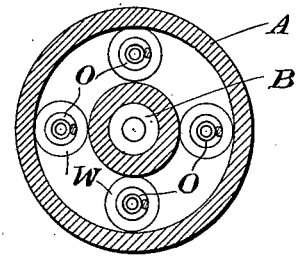
Inventor
Gottlieb R. Holliger
By Victor J. Evans
Attorney G. R. HOLLIGER.
VALVE FOR GAS ENGINE STARTERS.
APPLICATION FILED JUNE 15, 1912.
1,080,218.
Patented Dec. 2, 1913.
2 SHEETS—SHEET 2.
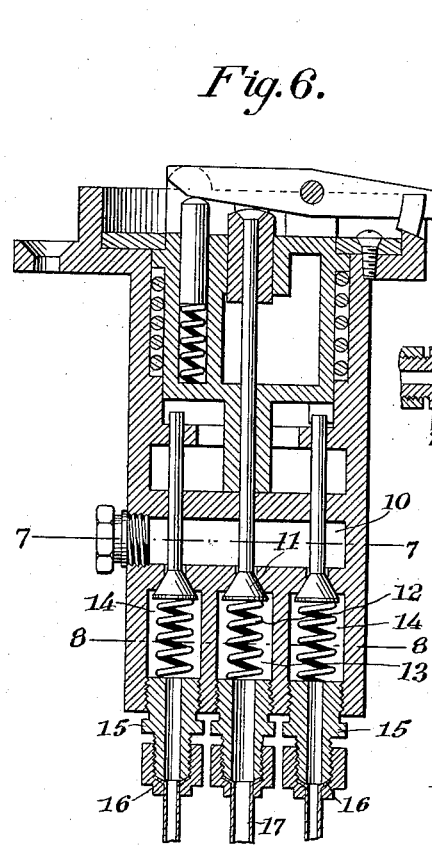
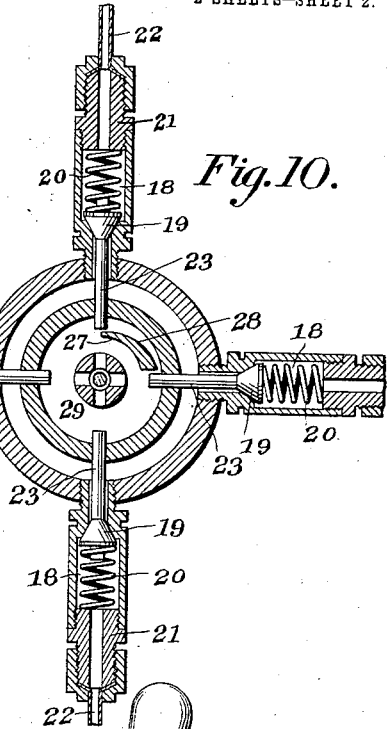
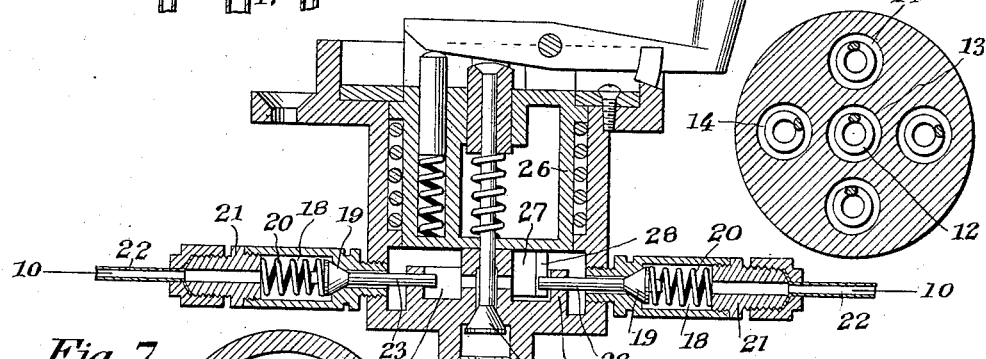
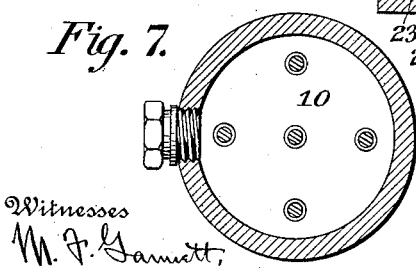
Inventor
Gottlieb R. Holliger
By Victor J. Evans
Attorney
Witnesses

UNITED STATES PATENT OFFICE.

GOTTLIEB R. HOLLIGER, OF BIRMINGHAM, ALABAMA.

VALVE FOR GAS-ENGINE STARTERS.

1,080,218. Specification of Letters Patent. Patented Dec. 2, 1913.

Application filed June 15, 1912. Serial No. 703,880.

*To all whom it may concern:*

Be it known that I, GOTTLIEB R. HOLLIGER, a citizen of Switzerland, residing at Birmingham, in the county of Jefferson and State of Alabama, have invented new and useful Improvements in Valves for Gas-Engine Starters, of which the following is a specification.

This invention relates to distributer valves for engine starters, the object of the invention being to provide a valve of the class described which combines a receiving and distributing chamber and a series of outlet chambers, the number of which is in proportion to the number of cylinders of the engine, combined with manually operated means, whereby equal charges of gas may be transmitted to the several cylinders of the engine, preparatory to the ignition of such charges, and the starting of the engine thereby.

A further object of the invention is to provide in connection with the individual valves of the device, springs for holding said valves yieldingly to their seats, aided by the pressure of the gas itself, thereby insuring the proper and quick seating of the valves, and avoiding leakage around such valves.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a plan view of the distributer valve. Fig. 2 is a vertical diametric section through the same. Fig. 3 is a cross section through the same on the line 1—1 of Fig. 2. Fig. 4 is a cross section on the line 2—2 of Fig. 2. Fig. 5 is a cross section on the line 3—3 of Fig. 2. Fig. 6 is a vertical diametrical section similar to Fig. 2, showing a modified circular arrangement of outlet valves. Fig. 7 is a cross section on the line 7—7 of Fig. 6. Fig. 8 is a cross section on the line 8—8 of Fig. 6. Fig. 9 is a vertical diametric section similar to Figs. 2 and 6, showing what I term a radial arrangement of outlet valves. Fig. 10 is a horizontal section on the line 10—10 of Fig. 9.

The valve as a whole comprises a housing or casing A, in the bottom of which is formed a gas receiving chamber B, into which is screwed the coupling Y of the supply pipe, by which the gas is fed to the distributing valve. Just above the chamber B is the distributing chamber D which is thrown into and out of communication with the chamber B by means of a small conical valve E held to its seat by pressure of the incoming gas in the chamber B, and also by means of the spring P coiled around the stem of said valve, as shown in Fig. 2. Above the distributing chamber D there are arranged outlet chambers C, into which are screwed the nipples Z of the pipes which lead off to the several cylinders of the engine.

By reference to Fig. 4, it will be seen that the chambers C are arranged in a circular series, each chamber being in communication with the distributing chamber D, and controlled by an outlet valve F, the stem F' of which extends upward through suitable guide openings in the body of the housing, as shown in Fig. 2. The valves F are held seated by means of coiled springs O which are interposed between the bottoms of said valves and screw plugs W inserted in the openings in the bottom of the housing for giving access to said springs and enabling the springs and outlet valves F to be removed for grinding or repair.

Within the upper portion of the housing is arranged an outlet valve operating element M, in the form of a rotating drum, said drum being provided with a central opening, through which the stem of the valve E passes. On the upper end of this stem is mounted a head K which is slotted at its upper end, as shown, to receive an operating crank G, the handle of which extends upward from the outer end thereof, as clearly shown in Fig. 2. This operating crank is mounted to rock on the pin or pivot J, while the outer portion of the operating crank rides upon a cam flange L extending upward from the top of the housing, said cam flange being provided with a notch H, into which the outer end of the crank is adapted to drop after completing a whole revolution, or after being swung through an arc of 360°. The spring P above referred to is confined between the head K on the stem of the valve E and the bottom of the drum M.

In order to insure the crank G engaging the notch H, a plunger R is arranged in a recess in the drum, in which it is adapted to move up and down, being normally pressed upward by means of a spring Q. The upper end of the plunger R operates against the inner extremity of the crank G, so as to lift the inner end of said crank to a point beyond that to which the stem of the valve E will carry it, thereby insuring the engagement of said crank in the notch H, after a complete revolution of the crank has been effected.

Extending around the drum M is a coiled spring S, one end of which bears against an annular shoulder within the housing A, while the upper end thereof bears against an annular shoulder U extending around the drum M. Above the shoulder U there is arranged a retaining ring T fastened to the top of the housing A by screws or the equivalent thereof, said ring T serving to prevent the drum from working out of the top of the housing.

The drum M is provided on the under side thereof with a cam lip or projection N which is adapted to successively come into contact with the stems F' of the outlet valves F, so that each of said valves is operated independently of the others, one at a time, each valve opening and closing before any other valve is affected. The drum M bears at the points U and V against the interior of the housing, so that there is no danger of said drum binding in the rotative movement thereof within the housing, when operated by the crank G.

The crank G being lifted by means of the handle thereof out of its notch H, turns on the pin J, pressing with its other end the plunger K down, and through the medium of the stem moving the valve E away from its seat, permitting gas to enter the chamber D. The crank G is then turned around the axis of the stem of the valve E, and by reason of said crank being upheld by the cam flange L, the valve E is held open through the entire revolution of the crank. The drum M revolves with the crank G and the cam projection N at the bottom thereof presses successively against the stems of the valves F, opening said valves, one after the other, and letting the gas pass out of the distributing chamber to the respective outlet chambers and cylinders in communication therewith. The cam N, after passing each of said stems, permits the valve to be closed by the spring O assisted by the gas pressure in the distributing chamber. The gas pressure in the chamber B assists in holding the inlet valve E closed, after the complete revolution of the operating crank. When the crank reaches the starting point, it snaps back into the notch H, by means of the pressure of the springs P and Q. The spring P moves the head K outward until stopped by the seating of the valve E, and the spring Q moves the plunger R until the seating of the crank G in the notch H stops further motion. A small clearance is thereby left between the crank G and the head K, insuring the absolute closing of the valve E.

Another circular arrangement of valves is shown in Fig. 6, in which 10 designates the gas distributing chamber fed by the central inlet valve 11, which is held to its seat by a spring 12 arranged beneath said valve, and in the receiving chamber 13. In this arrangement also, the outlet chambers 14 are arranged in a circular series around the receiving chamber and open out at the bottom of the casing, into which outlet nipples 15 are screwed, as shown, 16 designating the service pipes which lead to the engine cylinders. 17 designates the centrally arranged supply pipe.

Instead of the circular arrangement of outlet valve chambers shown and described in connection with Figs. 2 and 6, I may, in some instances, employ what I term a radial arrangement of outlet valve chambers, as shown in Figs. 9 and 10, 18 designating the outlet valve chambers which are located in a common horizontal plane, and which radiate outwardly from the casing of the device. In the radially disposed chambers 18 are arranged the horizontally movable outlet valves 19, outside of which are arranged the valve seating springs 20 interposed between the valves and the outlet nipples 21, to which the service pipes 22 are connected, the latter leading to the several cylinders of the motor.

In the arrangement of the valves shown in Figs. 9 and 10, it will be observed that the outlet valve stems 23 extend inward through guides 24 toward a common center, or in other words, toward the stem of the central inlet valve 25. This necessitates a slight modification in the operating cam lip on the bottom of the revolving drum, shown at 26. Said cam lip 27 is provided with a beveled working face 28 which successively comes into contact with the inner extremities of the valve stems 23, unseating one valve at a time and allowing the gas from the distributing chamber 29 to pass to the cylinder represented by that particular valve. In this way, each of the cylinders is fed with gas independently of the other cylinder, the same as described in connection with the circular arrangement of valves, shown in Figs. 2 and 6.

What is claimed is:

1. A valve for gas engine starters, comprising a housing, a gas inlet and pressure chamber, a distributing chamber, a circular series of outlet chambers, an inlet valve between the inlet and distributing chambers, a circular series of outlet valves between the distributing and outlet chambers, and a manually controlled valve operating device for successively opening the outlet valve while the inlet valve remains open.

2. A valve for gas engine starters, comprising a housing, a gas inlet and pressure chamber, a distributing chamber, a circular series of outlet chambers, an inlet valve between the inlet and distributing chambers, a circular series of outlet valves between the distributing and outlet chambers, a manually controlled valve operating device for successively opening the outlet valves while the inlet valve remains open, and means for locking said device when all of the valves are closed.

3. A valve for gas engine starters, comprising a housing, a gas inlet and pressure chamber, a distributing chamber, a circular series of outlet chambers, an inlet valve between the inlet and distributing chambers, a circular series of outlet valves between the distributing and outlet chambers, and a rotary valve operating element adapted in each cycle of movement to hold the inlet valve open and successively open and close the outlet valves.

4. A valve for gas engine starters, comprising a housing, a gas inlet and pressure chamber, a distributing chamber, a circular series of outlet chambers, an inlet valve between the inlet and distributing chambers, a circular series of outlet valves between the distributing and outlet chambers, and a manually controlled valve operating device for successively opening the outlet valves while the inlet valve remains open, the inlet and outlet valves being normally held closed by gas and spring pressure.

5. A valve for gas engine starters, comprising a housing, a gas inlet and pressure chamber, a distributing chamber, a circular series of outlet chambers, an inlet valve between the inlet and distributing chambers, a circular series of outlet valves between the distributing and outlet chambers, and a manually controlled valve operating device for successively opening the outlet valves while the inlet valve remains open, the inlet and outlet valves being normally held closed by spring pressure.

6. A valve for gas engine starters, comprising a housing, a gas inlet and pressure chamber, a distributing chamber, a circular series of outlet chambers, an inlet valve between the inlet and distributing chambers, a circular series of outlet valves between the distributing and outlet chambers, and a rotary valve operating element adapted in each cycle of movement to hold the inlet valve open and successively open and close the outlet valves, each outlet valve being opened and closed independently of the other.

7. A valve for gas engine starters, comprising a housing, a gas inlet and pressure chamber, a distributing chamber, a circular series of outlet chambers, an inlet valve between the inlet and distributing chambers, a circular series of outlet valves between the distributing and outlet chambers, a rotary drum having a cam projection which successively operates the outlet valves, and a crank for revolving said drum and also operating the inlet valve.

8. A valve for gas engine starters, comprising a housing, a cam flange thereon provided with a stop notch, a gas inlet and pressure chamber, a distributing chamber, a circular series of outlet chambers, an inlet valve between the inlet and distributing chambers, a circular series of outlet valves between the distributing and outlet chambers, a rotary drum having a cam projection which successively operates the outlet valves, and a crank for revolving said drum and operating the inlet valves, said crank riding against the cam flange on the housing.

In testimony whereof I affix my signature in presence of two witnesses.

GOTTLIEB R. HOLLIGER.

Witnesses:
C. H. Bradley,
H. J. De Long.

Copies of this patent may be obtained for five cents each, by addressing the "Commissioner of Patents, Washington, D. C."